Figure 1:
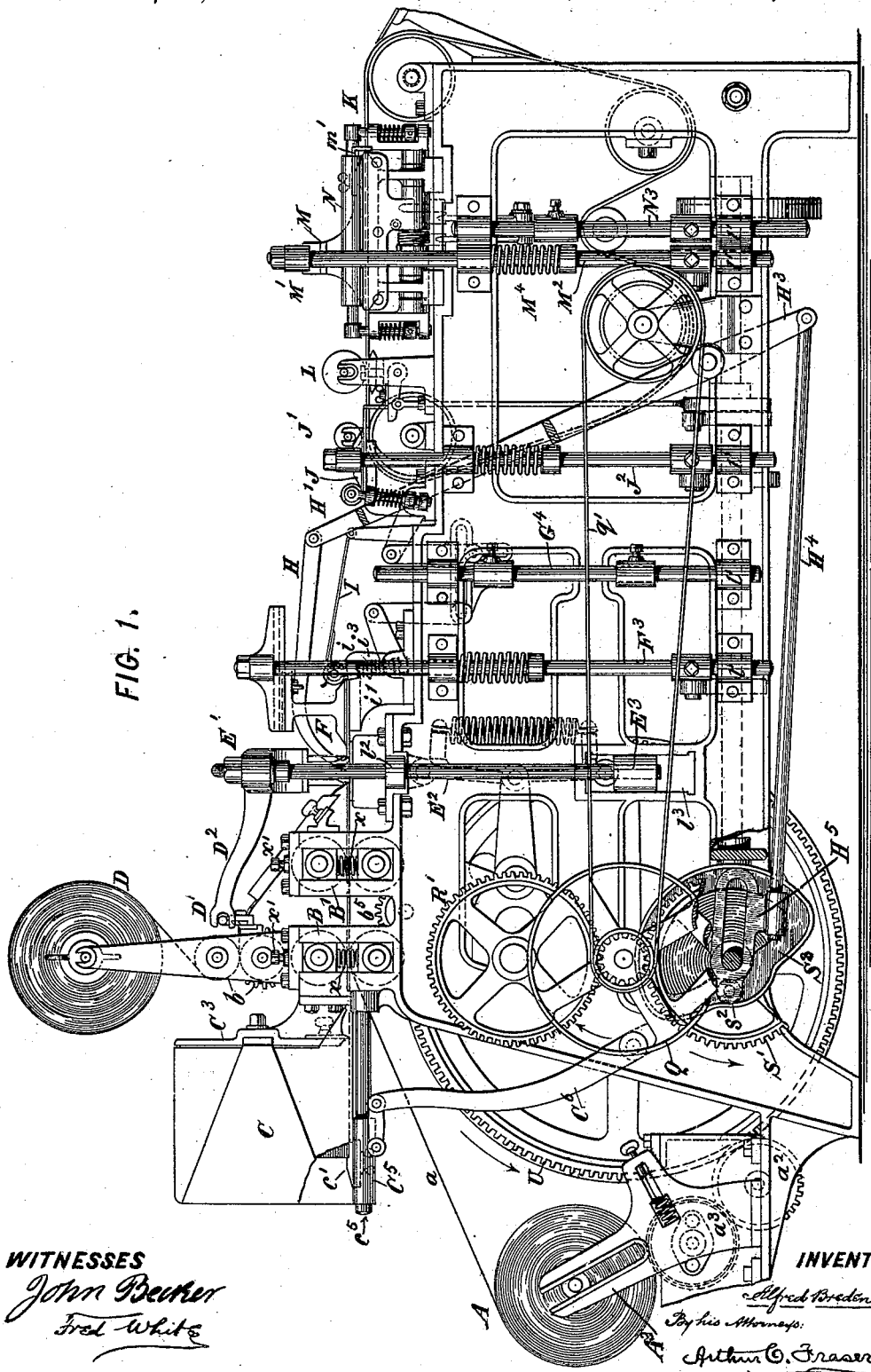

(No Model.) 12 Sheets—Sheet 2.

A. BREDENBERG.
BOOK COVER MACHINE.

No. 490,895. Patented Jan. 31, 1893.

WITNESSES
John Becker
Fred White

INVENTOR
Alfred Bredenberg
By his Attorneys
Arthur C. Fraser & Co.

(No Model.)   12 Sheets—Sheet 4.

A. BREDENBERG.
BOOK COVER MACHINE.

No. 490,895.   Patented Jan. 31, 1893.

WITNESSES
John Becker
Fred White

INVENTOR
Alfred Bredenberg,
By his Attorneys,
Arthur E. Fraser & Co.

(No Model.) 12 Sheets—Sheet 5.

A. BREDENBERG.
BOOK COVER MACHINE.

No. 490,895. Patented Jan. 31, 1893.

WITNESSES
John Becker
Fred White

INVENTOR
Alfred Bredenberg,
By his Attorneys
Arthur C. Fraser & Co.

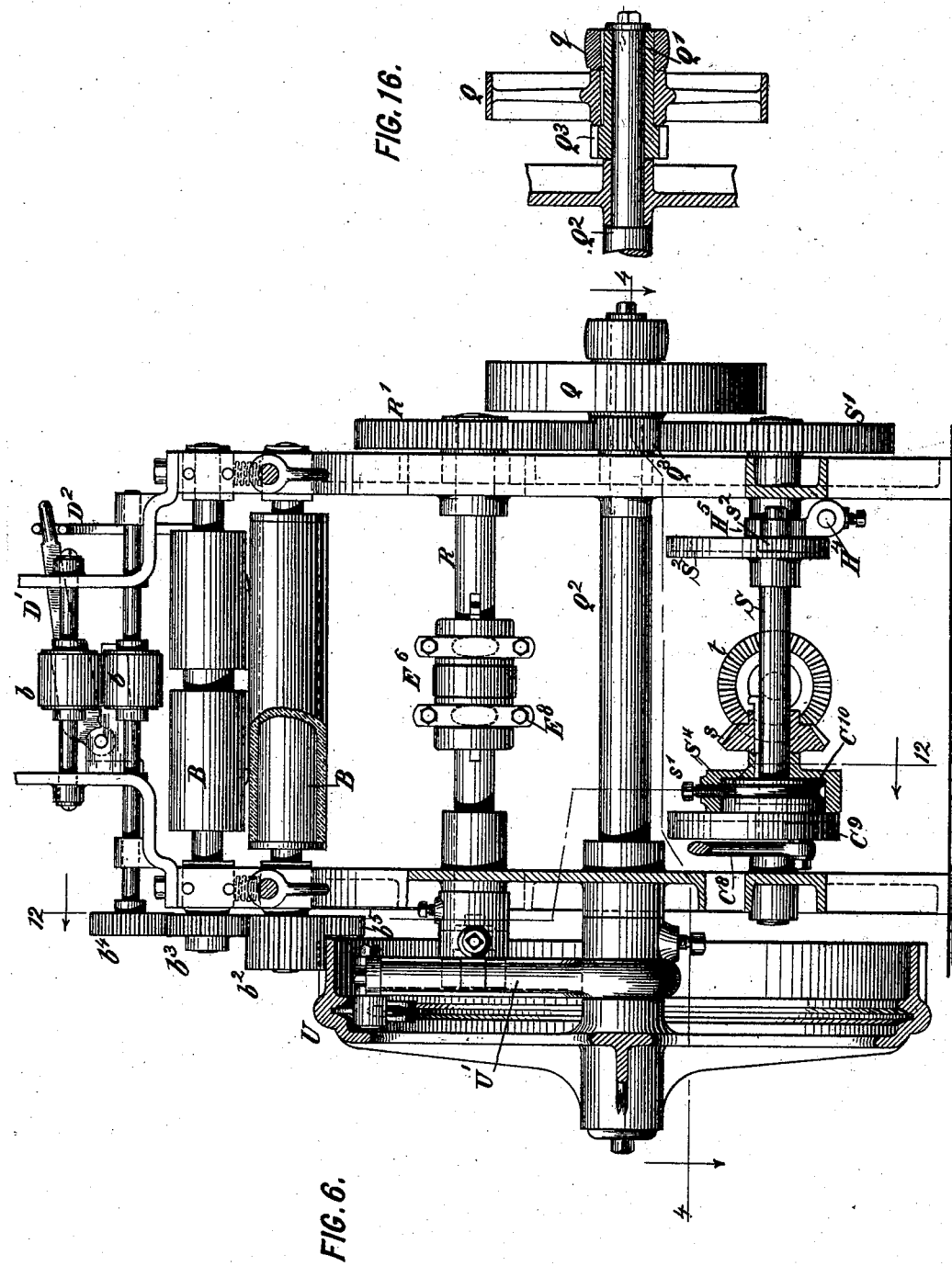

(No Model.) 12 Sheets—Sheet 7.

A. BREDENBERG.
BOOK COVER MACHINE.

No. 490,895. Patented Jan. 31, 1893.

WITNESSES
John Becker
Fred White

INVENTOR
Alfred Bredenberg,
By his Attorneys
Arthur C. Fraser & Co.

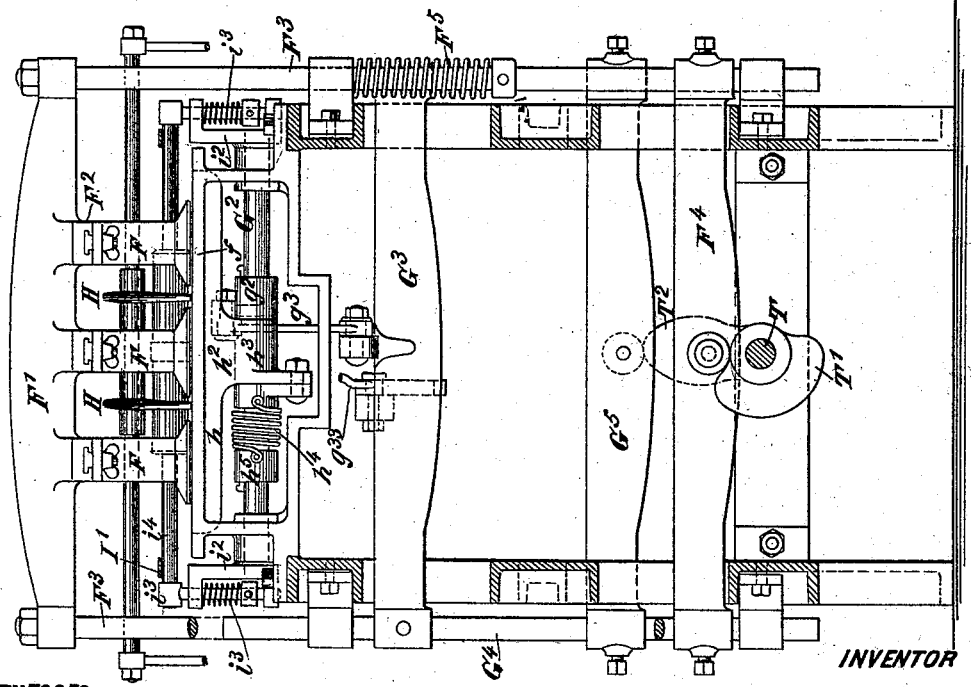

(No Model.)  12 Sheets—Sheet 9.
A. BREDENBERG.
BOOK COVER MACHINE.
No. 490,895.  Patented Jan. 31, 1893.
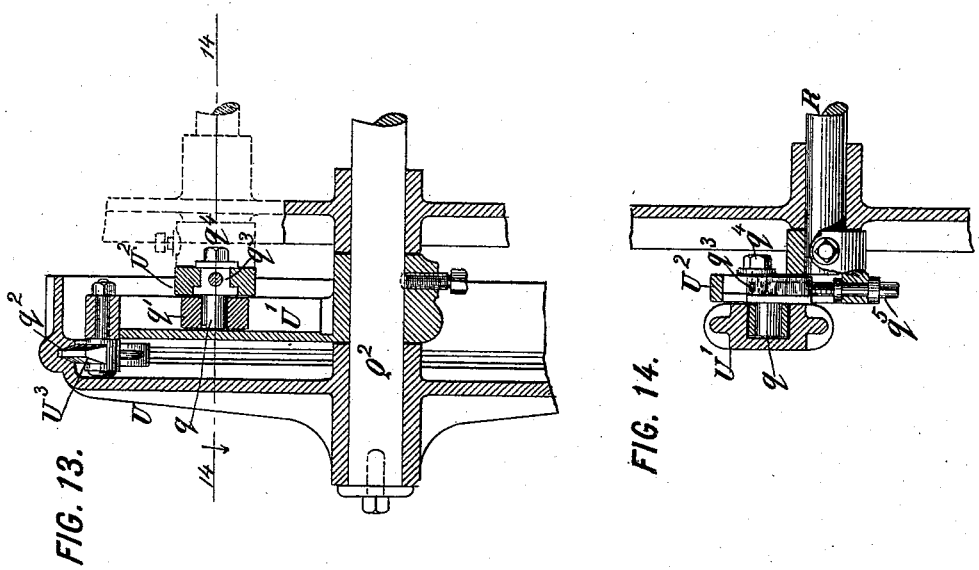
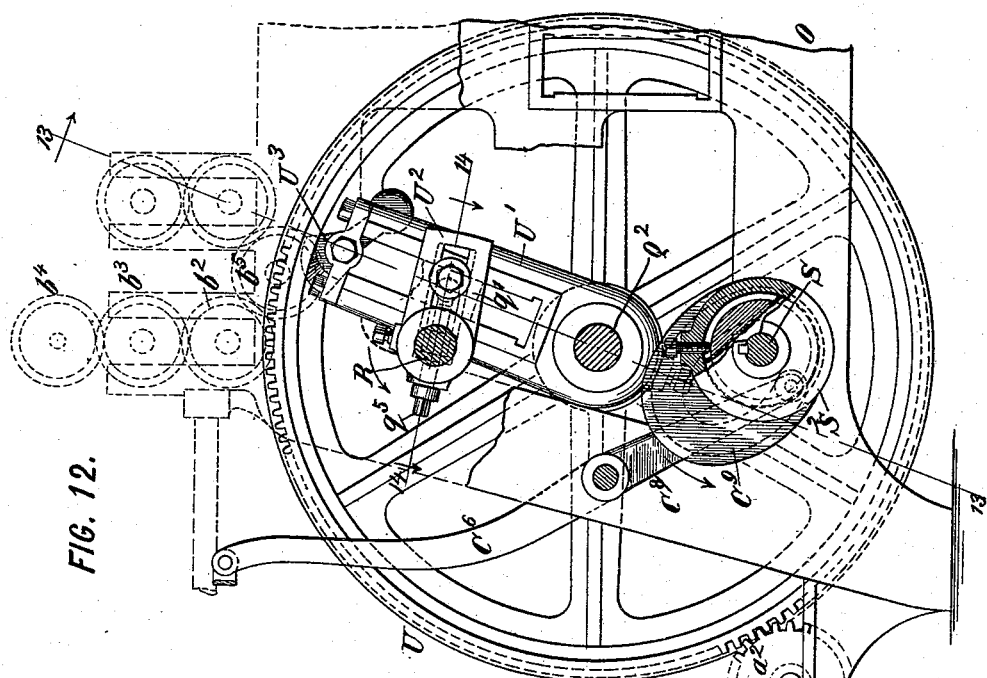
WITNESSES
John Becker
Fred White
INVENTOR
Alfred Bredenberg,
By his Attorneys,
Arthur C. Fraser & Co.

(No Model.) 12 Sheets—Sheet 10.
A. BREDENBERG.
BOOK COVER MACHINE.
No. 490,895. Patented Jan. 31, 1893.
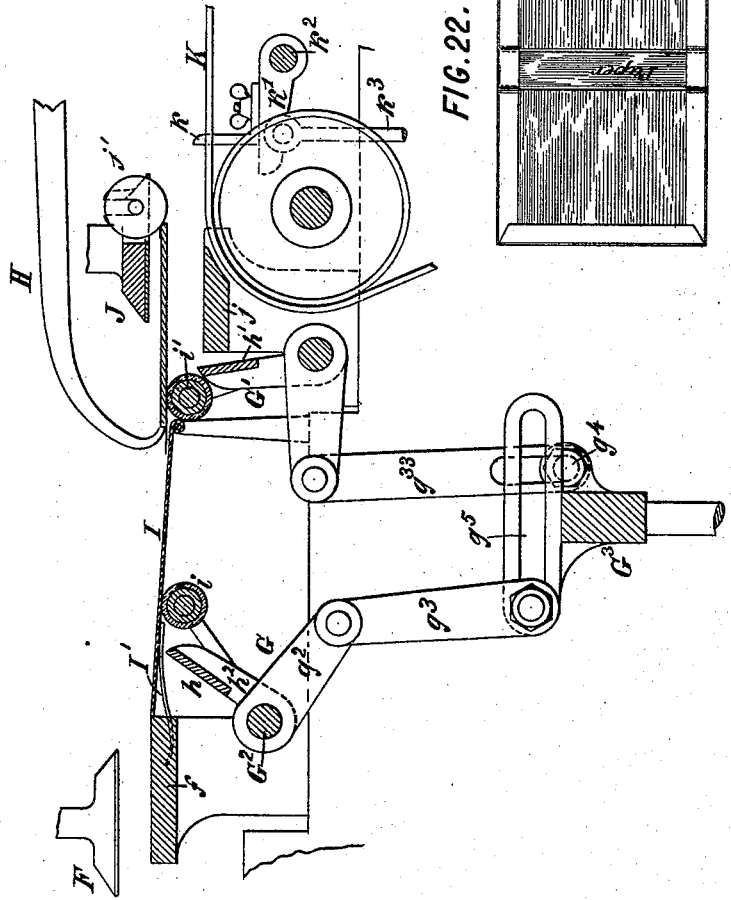
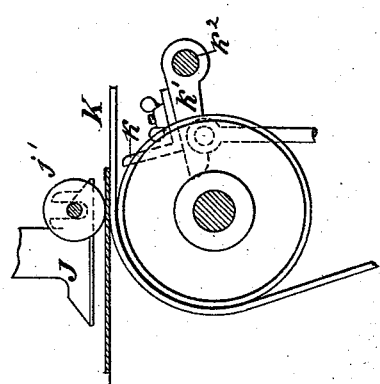
WITNESSES:
John Becker
Fred White
INVENTOR:
Alfred Bredenberg,
By his Attorneys,
Arthur C. Fraser & Co.

(No Model.)
A. BREDENBERG.
BOOK COVER MACHINE.
No. 490,895.
12 Sheets—Sheet 11.
Patented Jan. 31, 1893.
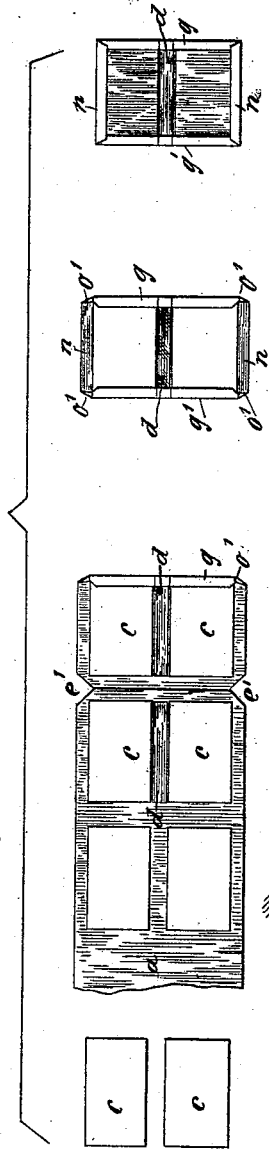
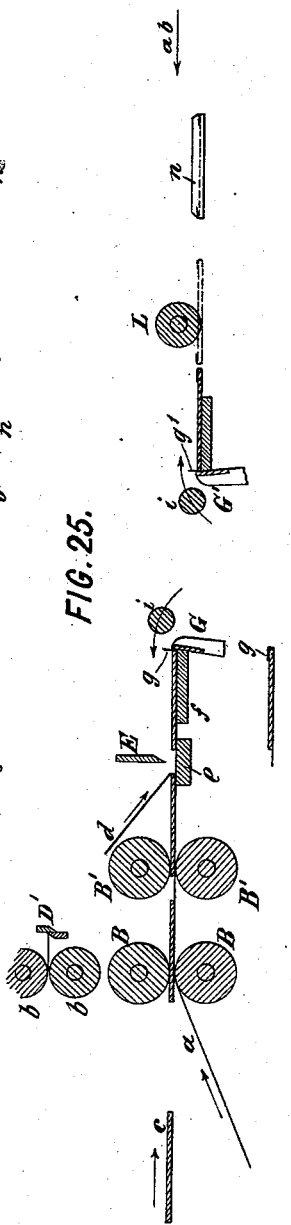
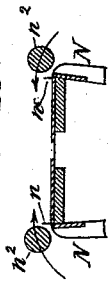
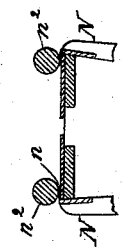
WITNESSES:
John Becker
Fred White
INVENTOR:
Alfred Bredenberg,
By his Attorneys,
Arthur C. Fraser & Co.

(No Model.) 12 Sheets—Sheet 12.

A. BREDENBERG.
BOOK COVER MACHINE.

No. 490,895. Patented Jan. 31, 1893.

WITNESSES:
John Becker
Fred White

INVENTOR:
Alfred Bredenberg,
By his Attorneys,
Arthur E. Fraser & Co.

UNITED STATES PATENT OFFICE.

ALFRED BREDENBERG, OF BROOKLYN, NEW YORK, ASSIGNOR OF TWO-THIRDS TO CHARLES W. LOVELL, OF SAME PLACE, AND JOHN W. LOVELL, OF NEW YORK, N. Y.

BOOK-COVER MACHINE.

SPECIFICATION forming part of Letters Patent No. 490,895, dated January 31, 1893.

Application filed April 27, 1891. Serial No. 390,549. (No model.)

*To all whom it may concern:*

Be it known that I, ALFRED BREDENBERG, a citizen of the United States, residing at Brooklyn, in the county of Kings and State of New York, have invented certain new and useful Improvements in Apparatus for Making Book-Covers, of which the following is a specification.

This invention relates to the manufacture of what are known to the binders' trade as "book cases," but which are hereinafter referred to as book covers. Such covers consists of two boards forming the sides of the book cover, with a sheet of paper, cloth or other suitable fabric the overlapping edges of which are folded down over and gummed to the boards. The boards are spaced apart a distance equal to the thickness of the book to be bound in the cover, and the intervening portion of cloth constituting the back of the book is ordinarily stiffened by gumming to it a sheet of paper or other stiffening fabric. Such covers have heretofore been made by hand.

The object of the present invention is to provide an apparatus for manufacturing them rapidly, cheaply, and with accuracy and precision.

In making book covers by hand, it is customary to cut the covering cloth or fabric into sheets of the proper size, to apply glue or other gum to the inner or reverse side of each sheet, to then place upon its gummed surface the two side boards in proper position, to apply to its gummed surface in the space between the boards a strip of paper or other stiffening material, and then to fold the overlapping edges of the cloth over upon the inner surface of the boards so as to overlap the end and side edges thereof.

In the operation of my improved machine, the cloth or other covering fabric cut in a long strip or web of the proper width proportionally to the width of the book cover to be made, is drawn continuously by either an intermittent or uniform movement from a roll and pressed against a gumming roll the surface of which is suitably coated with glue or other gum, whereby a film thereof is applied to the entire surface of the cloth. The gummed web of cloth is then carried over suitable rollers or guides, and a pair of boards is fed to it from two piles of boards cut to proper size and suitably held in any convenient form of magazine or hopper. The board-feeding mechanism delivers the boards to the strip of fabric in succession suitably timed relatively to the rate of feed of the fabric, to apply the pairs of boards against the fabric at proper successive intervals so as to leave the requisite space between the successive pairs to form the two overlapping flaps of proper width. The boards and fabric on being brought together are passed between pressure rolls which serve to press them tightly together and thereby cause the boards to adhere to the gummed surface of the fabric, while these rolls serve at the same time for feeding the web of fabric forward. On reaching a suitable position, a knife or cutter cuts across the web of fabric midway between two successive pairs of boards. The corners of the flaps or projecting edges of covering fabric are also cut off to the proper outline, preferably by the same operation, by providing the cutting knife with V-knives at its ends. If a stiffening strip is to be applied to the back of the cover, it is cut by shears from a web of paper or other material drawn from a roll thereof, and the strip thus severed is fed against the gummed surface of the cloth between the two boards of one pair, so that as the incomplete cover is fed along, the strip is applied to or laid against the gummed surface of what is to become the back of the cover. After the application of this strip, and either before or after the cutting off of the section or incomplete cover, the advancing edge or flap severed from the preceding section is folded over by a suitably constructed folder, being preferably a roller which turns down the flap upon the advancing ends or edges of the boards and rolls over the downturned flap or lap in order to press it firmly into position. Subsequently to the cutting operation by which the blank or section is cut off, its rear or following flap is turned forward and laid against the opposite end portions of the boards by another similar end folder. Both these end folders are provided with creasers for indenting the cloth close to the side edges of the boards at the corners to bring the cloth to conform neatly and exactly to the corners of the boards. These creasers consist preferably of flanges projecting from the ends of the folder rollers. These rollers are also provided with portions or bosses of larger diameter at their middles in order to enter between the two boards of the pair and roll down the portion of the end flaps overlapping the ends of the back of the cover. The back of the cover is further pressed in order to cause the stiffening strip to adhere firmly to the covering cloth, by passing the cover or blank against a roller which enters between the boards and presses only the intervening back. The final operation is then performed by means of side folders which fold over the projecting side flaps and lay them down firmly against the side edges of the boards, these folders consisting likewise preferably of rollers which roll over the turned down flap to press it into firm adherent contact with the boards. During the operation of the end and side folders, the cover blank is held firmly by clamps the jaws or members of which have flat faces which press the boards between them, thus not only preventing their displacement during the folding operations, but also serving to more perfectly unite the boards to the covering cloth.

The exact succession of operations is not essential, but it is preferable that the end flaps be folded over first, either simultaneously or successively, and the side flaps last, although this arrangement might be reversed.

Figure 2:
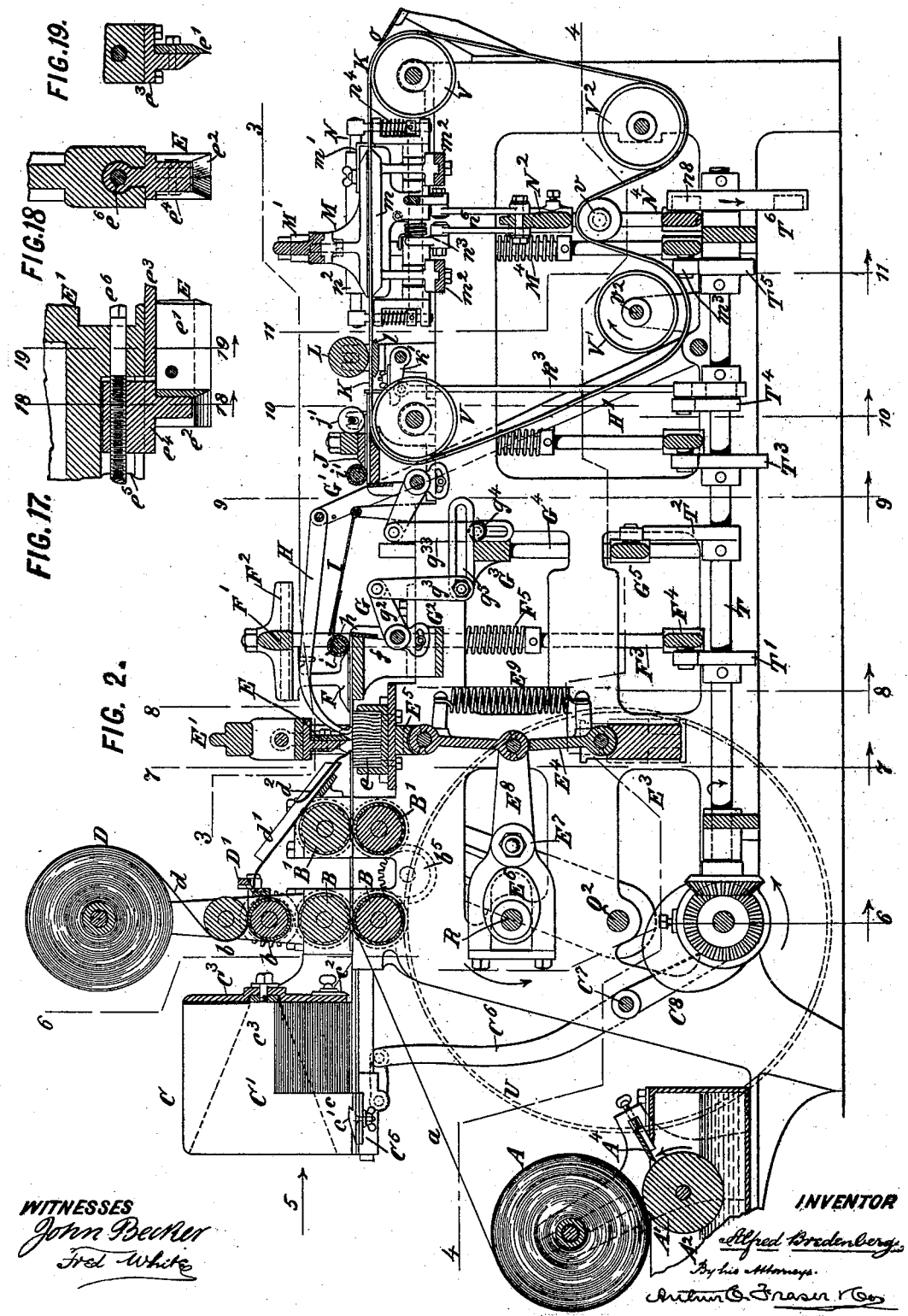
Figure 3:
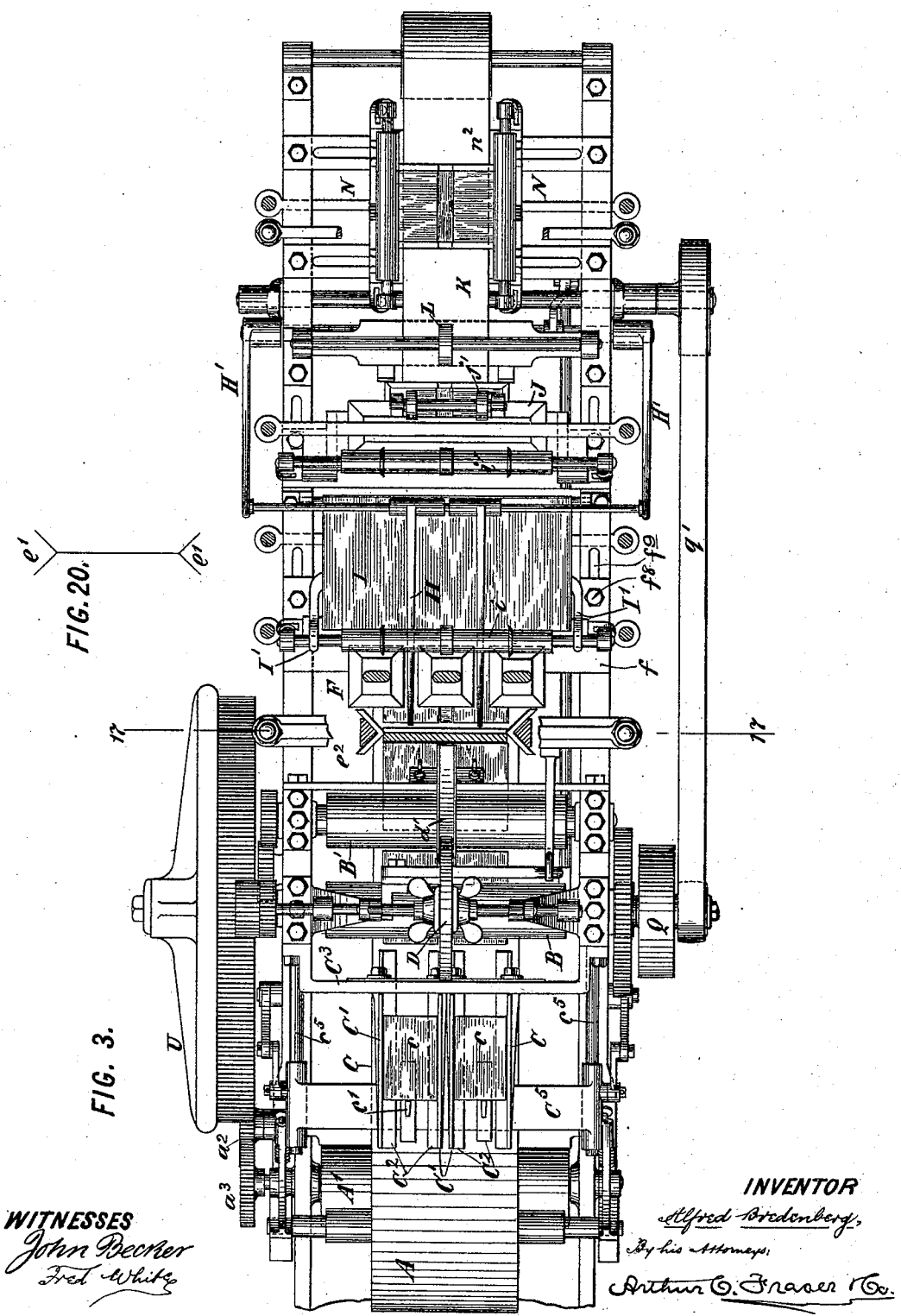
Figure 4:
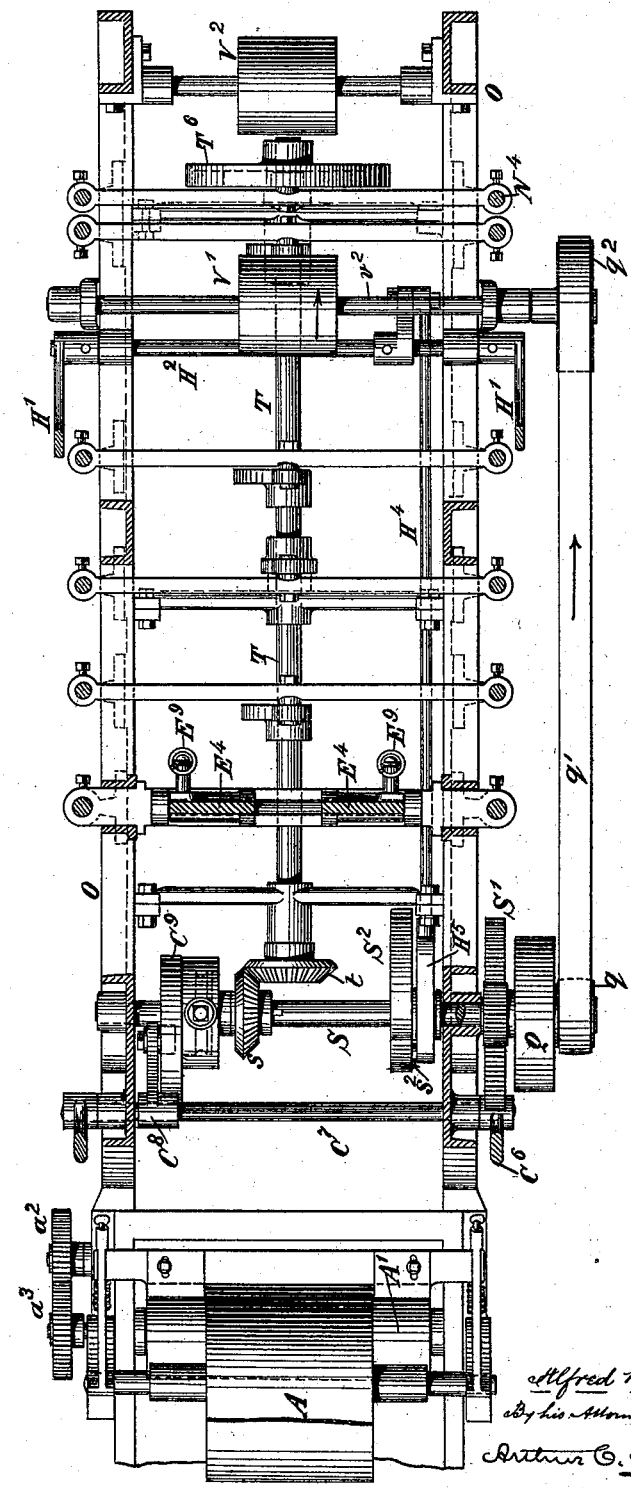
Figure 5:
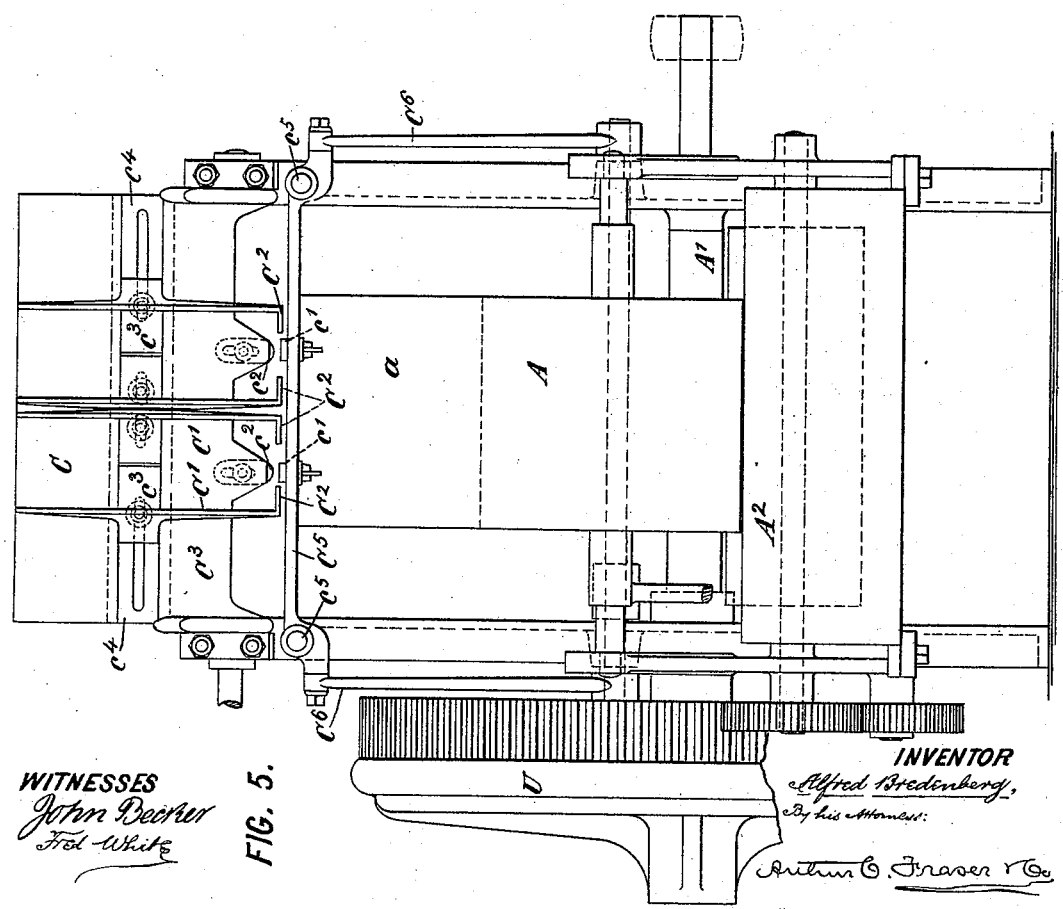
Figure 29:
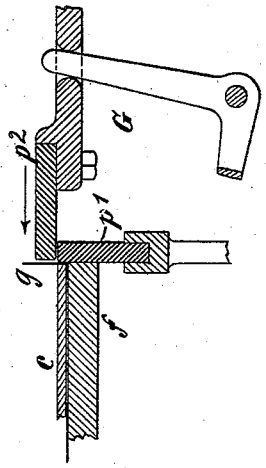
Figure 30:
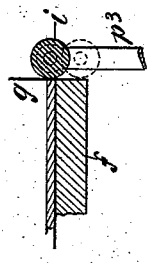
Figure 31:
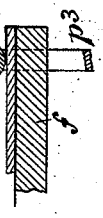
Figure 26:
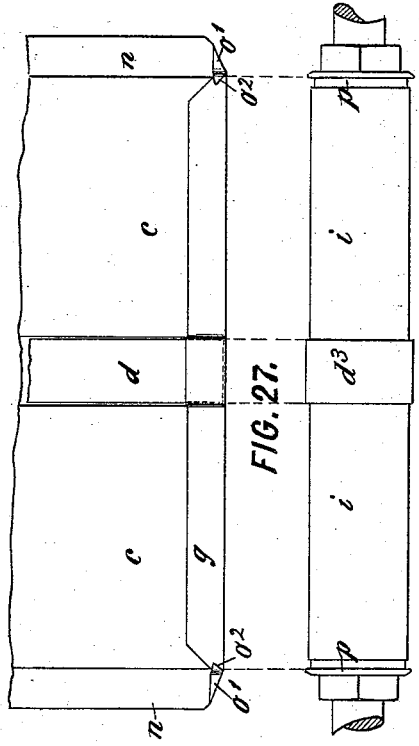
Figure 27:
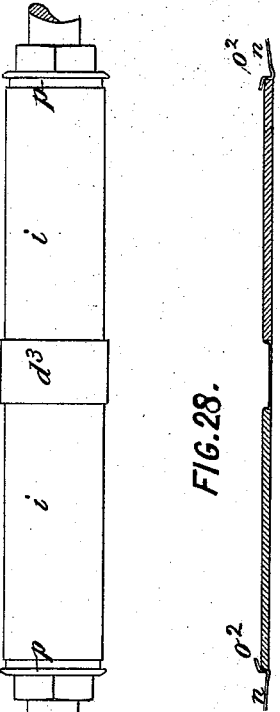
Figure 28:

Having now given a general idea of the nature of my invention, I will proceed to describe in detail my improved machine for automatically manufacturing book covers. This machine is shown in the accompanying drawings, wherein, Figure 1 is a side elevation partly broken away to show certain parts not otherwise visible; Fig. 2 is a vertical longitudinal section cut approximately through the middle of the machine; Fig. 3 is a plan of the machine partly in horizontal section cut in the plane of the line 3—3 in Fig. 2; Fig. 4 is a horizontal section cut generally in the plane of the line 4—4 in Fig. 2; Fig. 5 is an elevation of the rear or entering end of the machine; Figs. 6 to 11 inclusive are vertical transverse sections cut approximately in the planes denoted respectively by the like numbered dotted lines 6—6 to 11—11 in Fig. 2, and all looking toward the right in that figure; Fig. 12 is a fragmentary vertical longitudinal section cut approximately in the plane of the line 12—12 in Fig. 6 and showing in detail the intermittent feed mechanism; Figs. 13 and 14 are further details of this mechanism; Fig. 13 being a fragmentary section taken approximately on the line 13—13, and Fig. 14 a fragmentary section cut transversely thereof on the line 14—14 in Figs. 12 and 13; Fig. 15 is a fragmentary vertical section in the same plane as Fig. 2, but on a larger scale, and showing the parts in a different position; Fig. 16 is a fragmentary vertical transverse section showing a detail of Fig. 6; Figs. 17, 18 and 19 are fragmentary detail views of the knife or cutter for severing the successive cover blanks; Fig. 17 being a section cut in the plane of the line 17—17 in Fig. 3, Fig. 18 a vertical transverse section thereof on the line 18—18 therein, and Fig. 19 a transverse section on the line 19—19. Fig. 20, (Sheet 3,) is a diagram showing the cut made by this knife or cutter. Fig. 21 is a fragmentary detail view, being a longitudinal section of part of Fig. 15 on a larger scale and showing the parts in a different position; Fig. 22 is a plan of the finished cover produced by this machine, and Fig. 23 is an edge view thereof; Fig. 24 is a plan showing the course of the fabric through the machine and the successive stages of its manufacture into the book cover; Fig. 25 is a side view of Fig. 24, showing also certain of the tools or active parts which perform the successive operations; Figs. 25$^a$ and 25$^b$ are views looking in the direction of the arrow $a\ b$ in Fig. 25; Fig. 26 is a fragmentary plan of one end of the cover blank showing it just after the first end fold has been made; Fig. 27 is an elevation of the roller which produces this end fold; Fig. 28 is an edge view of the cover blank shown in Fig. 26; Fig. 29 is a vertical longitudinal fragmentary section showing a modification of the end folding mechanism; Figs. 30 and 31 are similar views showing another modification thereof.

Figs. 24 and 25 show most clearly the successive manipulations which are performed in the making of the covers. These views may advantageously be followed in connection with Figs. 2 and 3. The cloth or other covering fabric $a$, drawn from the roll A (Fig. 2) is pressed in contact with a revolving glue roll A', turning in a tank or vessel A² containing glue or other gum or adhesive substance by which the reverse side of the cloth is gummed, and the web of cloth is drawn thence to feeding rolls B B, between which it passes. The boards $c\ c$ are stored in a magazine C, from which they are fed by reciprocating pushers $c'\ c'$, the two boards of one pair being fed from the magazine simultaneously and in correct position relatively to one another, and pushed forward between the feed rollers until grasped by these rollers, which then feed them forward and at the same time press them against the glued face of the cloth. Before the boards pass entirely through the rollers B B, their advancing ends enter between rollers B' B', which continue to feed them forward and again press them into firm contact with the cloth. Preferably the feed of the rollers B B' is intermittent. By these mechanisms successive pairs of boards $c\ c$ are glued to the face of the cloth $a$ as shown in Fig. 24.

A strip of paper or other stiffening fabric $d$ is drawn from a roll D between feeding rolls $b\ b$, and is cut off by shears D' into lengths preferably equal to the lengths of the boards $c\ c$. Each strip as cut off slides down a guideway $d'$ and beneath a gage $d^2$, the lower end of which extends down close above the glued surface of the cloth but does not touch it. Thus the advancing edge of the strip is guided into place and falls against the glued face of the cloth in line with the advancing edges of the boards and in the space between them, it being cut off and falling to its position at the instant when the cloth is stationary. At the next forward feeding movement of the web of cloth, the strip slides down as the cloth moves forward and spreads itself out on the glued surface of the cloth in the position shown in Fig. 24, resting lightly thereon. After each forward feeding movement the web stops with the space between two successive pairs of boards over a cutting block $e$, and a knife or cutter E descends and its edge severs the cloth, thereby cutting off the cover section or blank as shown in Fig. 24. The cut made by the knife is of the shape shown in Fig. 20, the knife having V-shaped end portions which form cuts $e'\ e'$, thereby cutting out triangular pieces from the opposite edges of the web and consequently cutting off the corners of the overlapping edges or flaps projecting beyond the edges of the boards, as shown at $e'$ in Fig. 24. During this cutting off operation the cover blank in advance of the knife and which is severed thereby, is held firmly pressed down against a table $f$ by a clamp F, and while thus held the advancing edge or flap $g$ is turned up and folded down upon the ends of the boards and the intervening strip $d$, by an end folder designated as a whole by the letter G. This folder may be variously constructed, but in the construction shown it is made with two parts, the one for turning up the edge of the cloth and holding it firmly against the end edges of the boards, and the other for folding it down against the upper surfaces of the boards and for rubbing or pressing it into firm adherence therewith. The end flap $g$ is thus turned down as shown in Fig. 24. At the conclusion of this folding operation, the active parts of the folder G having receded, the clamp F rises, thereby freeing the cover blank. As this blank has been severed by the knife from the web, it can no longer be readily fed by the feed rolls, and therefore in order to feed it forward for the next operation I provide by preference feeding arms H H terminating in hooks or claws which as the arms are moved forward engage against the rear ends of the boards and push or slide the blank forward. For supporting the blank during this movement, a table or bridge I is provided, which at this time is depressed in the position shown in Fig. 15, so that as the hooks draw the blank forward it slides from the table $f$ onto the bridge I and is moved along over the latter, again dropping from the farther end of this bridge onto the table $j$. A clamp J then descends and clamps the blank firmly down upon this table, and while it holds it there, another end folder, designated as a whole by the letter G', turns up the opposite end flap $g'$ and folds this down upon the ends of the boards and intervening strip, as shown at $g'$ in Fig. 24. When the active parts of the end folder G' have receded, the clamp J rises sufficiently to release the cover blank, which is then fed forward by a belt or endless apron K. This apron draws it over a table $l$, over which is mounted a heavy roller L of a width just sufficient to enable it to enter between the boards $c\ c$ and thereby exert a pressure against the back of the cover blank to press the stiffening strip $d$ firmly down and glue it securely to the back portion of the cloth. Displacement of the stiffening strip during this operation is prevented by its opposite ends being firmly cemented down by the respective flaps $g\ g'$.

The cover blank is fed forward by the apron K until it passes over a table $m$, whereupon the apron stops, and a clamp M descends clamping it firmly upon this table. While it is thus held, its side flaps $n\ n$ are folded down by side folders N N which may be constructed and operated in similar manner to the respective end folders G and G'. These flaps having been folded and firmly pressed down, the cover is completed. The clamp M rises immediately after the recession of the side folders, and at the next forward movement of the feeding apron K the cover is fed forward and delivered from the machine by descending over a slide $o$ Fig. 2.

The completed cover is shown in Figs. 22 and 23.

The specific construction of the several tools or instrumentalities which perform the operations thus described is not essential to my invention in its broader sense. I will proceed now to describe the preferred construction of these tools or active parts more specifically, in order that those skilled in the art to which my invention most nearly pertains may be fully advised of how to construct and operate machines embodying my invention. In this description I will pay no attention to the gearing or other mechanical means by which the requisite movements are imparted to the several active parts, as these specific mechanisms are still less essential to my invention and constitute merely specific features thereof which are subject to various modifications.

The roll of covering fabric A is wound on a suitable arbor which is dropped into slotted bearings $A^3$, Fig. 1, the exterior of the roll resting directly on the glue roller A' so that its weight serves to press the cloth against the glue roller. As the cloth winds off and the roll becomes smaller, its arbor descends in the slotted bearings. The glue roller revolves intermittently, turning only during the feed of the fabric, and moving in the same direction as the fabric, so that its movement assists the feed. The glue-roller is provided with a scraper or strickle $A^4$ (Fig. 2) by means of which the superfluous glue carried up from the bath is scraped off, leaving on the roller a film of the desired thickness. This scraper is made adjustable by means of adjusting screws at its ends in a well known manner.

The feed rolls B B' are or may be faced with rubber or other yielding material. Preferably the lower rolls which come against the face of the cloth are rubber faced. The rolls are provided with driving mechanism which causes them to revolve intermittently, moving each time a peripheral distance equal to the length of the cover blank, that is, to the length of the sections between the cuts of the knife. The two feed rolls of each pair are pressed apart by springs $x\ x$ interposed between their bearing boxes, and are adjusted toward each other by screws $x'$, seen in Fig. 1. By this means or any other suitable provision for adjustment, the rolls are spaced apart a distance just sufficient to admit and tightly clamp between them the combined thickness of the cloth and side boards, this space being sufficient to avoid contact of the upper roll with the gummed surface of the fabric. This is practically an important feature of the machine, since by this means the gumming of the rolls is prevented, while at the same time the fabric is firmly grasped where the boards lie over it in order to feed it forward. While the space between two successive pairs of boards is passing between one pair of rolls, the other pair of rolls is in engagement with a pair of boards and continues the feed of the fabric.

The side boards $c\ c$ are arranged in piles in a magazine C constructed in two compartments. These compartments, shown best in Figs. 3 and 5, are constructed each of two vertical side walls C' C' arranged in longitudinal planes, and having at their bottom ends inwardly turned or approaching flanges $C^2$ which support the pile of boards. There is space enough between the edges of the bottom flanges to admit the pusher $c'$ to work between them. The pusher acts to push one board out from the bottom of the pile, forcing it forward beneath the front wall $C^3$. At the bottom of this wall is an adjustable gage $c^2$, the bottom edge of which is set at such height as to admit the passage of only one board beneath it in order to prevent the pusher from forcing out two superposed boards at a time by reason of their adhering frictionally to one another. This gage is made adjustable, because the boards for different book covers will be made of different thicknesses. The front wall $C^3$ is preferably mounted on the frame of the machine, and the side walls C' are attached to it adjustably by means of base flanges $c^3$ on their front edges working in a horizontal slideway $c^4$ in the front wall, and fastened thereto by set-bolts working in slots. The object of this construction is to render the magazine adjustable for different sizes of covers. To fit it for a thicker book, the adjacent side walls C' are set farther apart to leave a greater space between the two side boards of each pair, while to adjust it to a wider book the outer side walls are adjusted to a greater distance from the inner ones. The pushers $c'$ are fastened adjustably to a reciprocating frame or table $C^5$ which slides on longitudinal rods $c^5$ or other guides.

The roll D of stiffening strip or paper is mounted on an arbor suitably hung above the machine, as shown in Figs. 1 and 2. The drawing rolls $b\ b$, one of which is preferably faced with rubber, are geared to the rolls B B so that they move intermittently therewith, moving each time a distance circumferentially somewhat less than that of the rollers B B in proportion as the length of the stiffening strips $d$ is less than the length of the sections of covering cloth. The cutter D' for cutting off the strips is constructed preferably as a shears, one blade of which is fixed and the other is pivoted at its outer end, being engaged by a fork in an arm $D^2$, Figs. 1 and 6, which is fastened to and moved by the frame of the cutter E.

Figure 7:
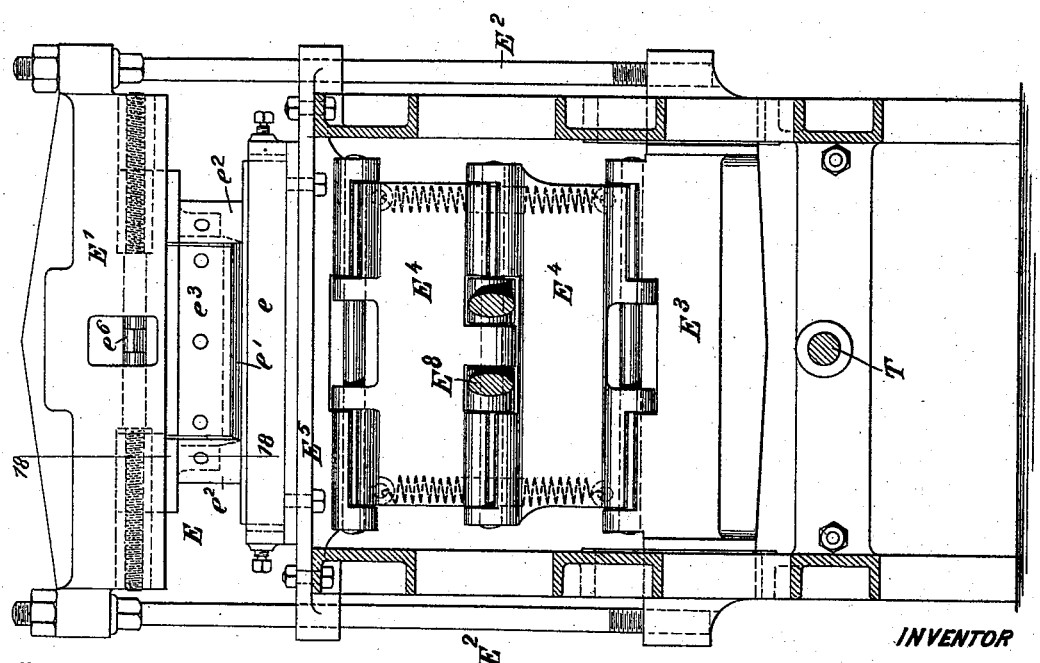

The cutter E for severing the sections or blanks of cloth, is constructed preferably with a cutting block $e$ beneath, mounted fixedly on the main frame of the machine, and cutting knives or blades carried by a rising and falling frame E' (Fig. 7). To this frame three knife-blades are fixed, namely, the blade $e'$ for making the straight cross cut, and two V-shaped blades $e^2\ e^2$ for making the corner cuts. The straight blade $e'$ is fastened to a bar $e^3$, Figs. 17 and 19, which is bolted directly beneath the frame E'. The V-shaped knives $e^2$ are fastened to adjustable blocks $e^4$, which are fastened in the frame E' in the manner shown in Figs. 17 and 18. Each one enters and may slide longitudinally in a groove $e^5$ formed in the under side of this frame, and a screw $e^6$ is provided, by turning which the blocks $e^4$ are propelled toward or from the center. This screw has right and left hand threads, so that the two blocks $e^4$ at opposite ends are moved simultaneously and equally toward and from the middle. The purpose of this construction is to facilitate the adjustment of the cutter for cutting cover fabric of different widths. To change to making wider covers, the blocks $e^4$ are screwed apart, the knife $e'$ and its supporting bar $e^3$ are removed, another knife of the proper length is substituted, and the blocks $e^4$ are screwed together again to bring the V-shaped knives against the opposite ends of the straight knife.

I will now describe the first end folder G and its accessories. The table $f$ on which the blank rests during the first end folding operation, is fixedly mounted on the frame of the machine and adjusted to such position relatively to the feed-rollers B B' that at each forward feeding movement the advancing ends of a pair of boards c shall be brought into exact coincidence with the front edge of this table. The clamp F then descends and presses the blank tight against the table. This clamp is made in three sections as shown in Figs. 8 and 3, in order to leave two intervening spaces through which the feeding hooks H H may work. The sections of the clamp F are fastened to a cross-head or supporting frame F', which is lifted off from the table and again moved down against it at suitable intervals. The frame F' is provided with transverse cross-heads F² extending longitudinally of the machine and formed with undercut grooves or slideways to provide for the attachment and longitudinal adjustment of the sections F F of the clamp. This longitudinal adjustment is designed to provide for adjusting the machine to make longer or shorter book covers. The table $f$ having been adjusted as described, the clamp F is adjusted to bring its forward side or edge, which is preferably beveled, backward sufficiently in the rear of the front edge of the table to expose fully the turned down end flap of the cover blank.

The end folder G consists preferably of two active parts, namely, a blade or folder-bar $h$ for turning up the edge of the cloth against the end edges of the boards and holding it firmly and squarely against these edges, and a folding roller $i$ for subsequently laying down the upturned flap upon the upper side of the boards when pressing it into adherent contact therewith. In the preferred construction the blade $h$ and roller $i$ are both mounted on one shaft $G^2$, which is oscillated by suitable mechanism. The roller is moved angularly in positive manner by this shaft, while the blade is connected to the shaft through a yielding or elastic connection, so that it is moved angularly with the shaft until stopped by abutment against the table $f$, whereupon the continued movement of the shaft compresses the intervening spring. In the retracted position of the folder the blade $h$ stands in advance of the roller $i$, as shown in Fig. 15, and during the advancing movement they maintain the same relative positions until the blade $h$ is stopped, after which the roller $i$ continues its motion, passing over the top of the blade $h$ and rolling over the table $f$ and the cover blank to the position shown in Fig. 2. The blade in advancing encounters the projecting edge or flap and throws it up, and as the blade comes against the table it presses the flap firmly against the edge of the boards and holds it there while the roller rolls up over the top edge of the blade, and encountering the flap, presses it backward and lays it down on the boards, rolling over it to press it down thereagainst, and then on its retractile movement rolling again over the flap so that it presses the gummed surface thereof into firm adherent contact with the boards. When the roller has passed entirely off the blank, the blade $h$ moves out of contact with the edge thereof.

In the preferred construction, the shaft $G^2$, which is mounted in stationary bearings having an invariable relation with the table $f$, has fixed on its end frames $i^2$ which form bearings for radially sliding rods $i^3$, the upper ends of which carry bearings for the ends of the shaft $i^4$ carrying the roller $i$, as best shown in Fig. 8. Fixed on the shaft $G^2$ is a crank-arm $g^2$, which is connected by a link $g^3$ with a frame $G^3$, which is moved up and down at proper intervals by suitable mechanism. By this means the shaft $G^2$ is oscillated. The frame $G^3$ is provided with a longitudinal slot $g^5$ in which the stud to which the link $g^3$ is pivoted may be adjustably fastened, the purpose of this adjustment being to admit of the adjustment of the table $f$ and folder G longitudinally of the machine, to provide for blanks of different lengths. The folding blade $h$ is mounted on an arm $h^2$ projecting from a collar $h^3$ mounted loosely on the shaft $G^2$ and connected thereto through a spring $h^4$, the opposite end of which is connected to a collar $h^5$ fixed on the shaft, as best shown in Fig. 8. The other end folder G' is constructed in like manner with a folding blade $h'$ and a roller $i'$. As the construction of the mounting and operation of these parts are exactly the same as of the corresponding parts of the folder G, it is not necessary to repeat the description thereof. This folder G' is shown in Fig. 9, a comparison of which with Fig. 8 will show at a glance the identical construction of the corresponding parts. The only difference is that the shaft of the folder G' is oscillated to a less extent on its retractile movement than that of the folder G, as shown in Fig. 15. To accomplish this, the link $g^{33}$, through which motion is communicated from the frame $G^3$ which stud slides freely in the slot and acts upon the ends thereof to force the link up or down which operates both folders, is formed with a slot at its lower end engaged by a stud $g^4$ fixed to the frame $G^3$.

In order to feed the blanks from the table $f$ of the first end folder to the table $j$ of the second end folder, the transfer bridge I is provided over which the blank is pushed by feeding hooks H H. This bridge consists simply of a flat plate of sheet metal pivoted at its forward end and movable freely up or down at its rear end. When the end folder G has receded, this bridge drops of its own weight to the position shown in Fig. 15, and while in this position the hooks H H push the blank over it and beyond its forward end until the blank rests upon the table $j$ with its advancing edge in contact with a traveling belt K, which is in motion and which carries the blank forward until it is stopped by a gage $k$. The hooks H H do not pass off the bridge I, stopping in the position shown in Fig. 15. Upon the next movement of the end folder G, its roller $i$ acts to lift the bridge I, and as the roller passes beyond the rear end of the bridge, the latter is upheld by spring-arms I′ projecting from it which rest upon the shaft $i^4$ of the roller, so that the bridge is held up and out of the way and free from the roller during the time that the latter is rolling in contact with the blank. While the bridge is thus elevated, the hooks H H execute their return movement, riding up over the bridge, dropping over the roller $i$, and sliding over the blank until their ends stand in the position shown in Fig. 2 against the rear ends of the boards of the blank. When the blank has been fed forward and stopped by the gage $k$, it is held in position thereagainst and its correct engagement therewith assured by the belt K, which continues to travel for a short distance after bringing the blank against the gage. The clamp J then descends and clamps the blank firmly in position against the table just as or soon after the belt K comes to rest. The end folder G′ then folds over the second end flap as described. Meanwhile the gage $k$ moves down out of the way of the blank. As the folder G′ recedes, the clamp J lifts slightly sufficiently to free the blank, and the belt K again moves forward so that it feeds the blank off from the table $j$. In order to give the blank sufficient frictional engagement against the belt K to start it, I provide for pressing it down into contact with the belt by means of heavy rollers $j'$ mounted on an arbor which rests in open-slotted bearings, as shown in Fig. 2, carried by the clamp J. These slotted bearings are so deep that when the clamp J has risen sufficiently to release the blank, the bottoms of the bearings do not lift the rollers $j'$ but leave the weight of these rollers resting on the blank, (see Fig. 21) which consequently is pressed down thereby upon the apron K, so that as this apron starts it carries the blank forward with it. When the blank has thus been started and fed a sufficient distance, the clamp J rises to its uppermost position as shown in Fig. 15.

Figure 10:
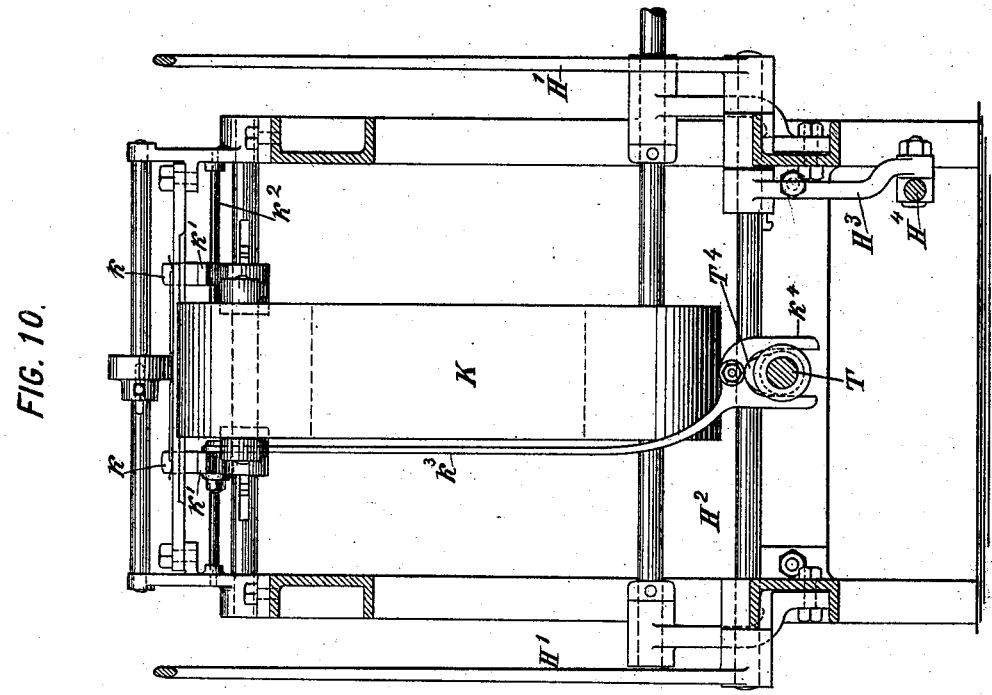

There are two gages $k\ k$ as shown in Fig. 10, and they are mounted on arms $k'$ fixed on an oscillating shaft $k^2$. The gages are longitudinally adjustable on these arms in order that they may be accommodated to covers of varying lengths.

As the blank is carried by the apron or belt K under the roller L, the latter presses down the stiffening strip $d$ of the back and the belt brings the blank against gages $m'$, over the table $m$, which stop the blank in the correct position. As the belt stops, or soon thereafter, the clamp M descends and holds the blank, while the side folders N N fold over its side flaps. These side folders are of precisely the same construction as the end folders G G′ already described (except in one respect to be hereinafter described). Each side folder consists (see Fig. 11) of a folding blade $n'$ answering to the blade $h$, and a roller $n^2$ answering to the roller $i$. The blades $n'$ are mounted on the oscillating shafts N′ through the medium of springs $n^3$, Fig. 2. The rollers $n^2$ are pressed down at their ends by springs $n^4$ applied to the sliding pieces on which the shafts are journaled. The shafts N′ are oscillated by fixed arms $n^5$ connected by links $n^6$ to a frame N² beneath, which is caused to move up and down at proper intervals of time by any suitable mechanism. All these parts being substantially counterparts of the corresponding parts of the end folder G, require no detailed description.

In order to adjust the machine to blanks of different widths, the table $m$ is made in two parts, each of which is mounted adjustably on cross-bars $m^2$ forming part of the main frame of the machine, so that their outer edges may be moved to the same distance apart as the total width of the finished cover to be made. The clamp M also requires to be similarly adjusted, and for this purpose is made likewise in two sections which are movable laterally in slideways formed on the under side of a cross-frame M′ which is moved up and down at proper intervals by suitable mechanism. The clamp M, table $m$, and side folders N, are made as long as the longest book cover that the machine is designed to make. The table $m$ and clamp M are made of a width when closed together no greater than the width of the narrowest cover that the machine is to make, and for wider covers they are moved apart. The table $m$ has a recess in its top through which the feeding belt K may travel. The shafts N′ of the side folders are mounted in bearings fixed relatively to the sections of the table $m$, so that the adjustment of the table effects simultaneously the proper adjustment of the side folders. The frame N² beneath is provided with an elongated horizontal slot $n^7$, the pivotal connections of the lower ends of the links $n^6$ being made with studs which are adjustable in this slot to admit of the varying adjustments of the side folders laterally to accommodate different widths of book covers. The end gages $m'$ are carried by the respective sections of the clamp M and are adjustable endwise thereon. When the clamp M lifts to release the blank after the side folds have been made, it consequently carries up the gages $m'$ with it, so that when the belt K again starts it feeds the finished cover out of the machine.

It will be observed in Fig. 24 that in cutting out the corners $e'$ the latter are cut back only part way toward the corners of the boards $c$. In turning over the end flaps $g\ g'$ it results that the portion of cloth forming these flaps and extending beyond the side edges of the boards $c$ is turned down upon the side flaps $n$, forming a double thickness, as shown at $o'$ in Fig. 24. In subsequently turning over the side flaps there would be liability of buckling this double thickness of cloth at $o'$ close to the corners, thereby making a bad finish for the corners of the cover.

To avoid this, I provide the means best shown in Fig. 27, for creasing down the overlying portion of cloth $o'$ at the corners of the side flaps. Fig. 27 is a detail view on a larger scale of the first end folding roller $i$. This roller is provided at its opposite ends with creasers $p$ $p$ consisting of flanges projecting approximately as far beyond the circumference of the roller as the thickness of the boards $c$. These creaser flanges are arranged with their inner surfaces exactly in line with the outer edges of the respective boards, so that as the roller $i$ approaches to lay down the upturned end flap, these flanges by slightly preceding it, break or crease the cloth against the corners of the boards, and as the roller progresses and turns down the flap, the creasers by running against the side edges of the boards continue the crease entirely across the double thickness $o'$. By the indenting of the cloth at the corner the creaser turns up a fold of cloth marked $o^2$ in Figs. 26 and 28, which by the action of the roller $i$ is pressed down flat upon the flap $g$. Or, by slightly grooving the roller $i$ at its ends, close to the creasers, this fold $o^2$ may be left standing instead of being pressed down. By thus tucking in and creasing and folding down the material at the corners the blank is prepared for the final folding over of the side flaps $n$, so that when this is done the cloth folds over neatly and makes a mechanically finished corner. In order to press down the cloth at the back portion of the cover, the roller is formed at its middle with a projection $d^3$ of larger diameter than the main portion $i$ of the roller, so that this portion enters the space between the cover boards $c$ $c$ and presses the overturned flap $g$ down tight against the back portion of the book cover so as to confine the ends of the stiffening strip $d$ and gum the flap $g$ securely thereto. The second end folder roller $i'$ is of precisely the same construction, these two rollers being counterparts as shown in Fig. 3, whereas the side folder rollers $n^2$ are simply plain rollers devoid of any creasers $p$ or projecting portion $d^3$. In adjusting for different widths of covers the end-folding rollers are removed and replaced by others having their creasers differently spaced. The provision of the end folders with means for effecting these creases to properly fold down the overlapping portion of the flaps at the corners, is an important feature of my invention. The creasers for this purpose need not necessarily be rotary creasers, nor need they be carried by the roller $i$, but they may be independent thereof, and may perform their work either before or after the action of this roller, but to mount them on the roller itself I consider the simplest and most effective construction.

I have stated that the end folders G G' and side folders N N may be greatly varied in construction. As one example of a modification that may be applied for this purpose I will refer to Fig. 29, where $p'$ designates a folding plate moving upwardly against the front edge of the table $f$ to fold the flap $g$ up and hold it against the edge of the board $c$, and $p^2$ represents a horizontally moving plate which subsequently travels in the direction of the arrow to fold down the flap $g$, and by rubbing across it to press it into firm adherent contact with the board. These folders may be operated by any suitable cams. The same construction may be applied to either end folder or the side folders. Another means is shown in Fig. 30, where the roller $i$ is mounted to move from the position shown in dotted lines upwardly along the edge of the table $f$ to turn up the flap and roll it against the edge of the board, the same roller being constructed to move around the upper corner of the board, and then horizontally to lay down the flap in the manner shown in Fig. 31. This roller $i$ may be mounted on a frame $p^3$ to which movement is imparted by any suitable cams for imparting to the roller the requisite movement first upwardly and then laterally back and forth, and finally downwardly to its starting point.

I will now proceed to describe the operating mechanism for driving the several active parts of my machine. It will be understood that the description which I will proceed to give is of the specific apparatus which I have adopted, but which may be variously modified without departing from the essential features of my invention.

In future machines embodying my present invention I may largely or wholly depart from the mechanical movements hereinafter described.

Power is applied to the machine by means of a belt-pulley Q (Figs. 1, 4 and 6) which is fixed on a sleeve Q' (Fig. 16) turning freely on a shaft $Q^2$. On the inner end of the sleeve Q' is formed a pinion $Q^3$ which, driven by the belt-pulley Q, meshes with two gears R' and S' which are fixed respectively on shafts R and S arranged above and below the shaft $Q^2$. On the shaft S is fixed a miter-gear $s$ meshing with a similar miter-gear $t$ fixed on the end of a shaft T which extends longitudinally through the machine, and on which are mounted the several cams for driving the active parts. The several shafts are mounted in bearings in the general frame of the machine, which consists of two longitudinal side frames O O and intervening cross-ties or braces at intervals.

The feed motion is given in the following manner. On the opposite end of the shaft $Q^2$ is loosely mounted a large gear-wheel U (Figs. 6, 12 and 13) and inside of this wheel is arranged a lever or crank-arm U' which is fixed on the shaft $Q^2$. The lever U' is given a vibratory motion by means of crank $U^2$ (Figs. 12 and 14) fixed on the shaft R. The crank-stud $q$ of this crank turns in a block $q'$ which slides in a slideway formed in the lever U'. As the crank $U^2$ revolves in the direction of the arrow in Fig. 12, it moves the lever U' slowly toward the left in Fig. 12 during a little over half the revolution, and more rapidly to the right on its return stroke during the remainder of the revolution. To the end of the lever is pivoted a friction-pawl $U^3$ having an eccentric wedging face which enters a V-shaped groove $q^2$ formed within the flange of the feed-driving wheel U. The pawl $U^3$ is counterweighted so that its wedging end is kept always pressed into this groove. During the working or leftward stroke of the lever $U'$, this pawl $U^3$ wedges itself fast in the groove $q^2$, so that during this stroke it carries the wheel U with it, but on the return stroke of the lever the pawl frees itself and slides back freely in the groove. The wheel U is moved forward intermittently a distance corresponding to the angular swing of the lever $U'$, which in turn is dependent upon the throw of the crank $U^2$. The feed-rolls B B are driven from the gear U by the direct engagement therewith of the gear-wheel $b^2$ on the spindle of the lower roll, which in turn drives a gear $b^3$ on the spindle of the upper roll, and this in turn drives a gear $b^4$ on the spindle of one of the rolls $b\ b$. The second pair of feed-rolls $B'\ B'$ is driven from the gear $b^2$ by an intermediate gear $b^5$. The glue-roll $A'$ is also driven from the gear U through the medium of gears $a^2\ a^3$, so that it advances intermittently, moving only when the web of fabric is fed forward.

In order to adjust the feed to varying lengths of cover blanks, it is necessary to drive the rolls B B', b and A' a greater or lesser peripheral distance at each feeding movement. This is accomplished by driving the gear U a greater or lesser distance. To do this the crank $U^2$ is made adjustable so that its throw may be increased or diminished. Its adjustability is best effected in the manner shown in Figs. 12 to 14. The crank-arm $U^2$ is slotted, and in its slot is mounted a sliding block $q^3$ carrying the stud $q$ and which may be set in any position by a screw $q^4$. To adjust the throw this screw $q^4$ is loosened, and by turning a screw $q^5$ the block is moved out or in to the desired position.

The movement of the slide $C^5$, carrying the pusher $c'$ for feeding the boards, is effected as follows. This slide is connected by links to lever arms $C^6$ fixed on a rock-shaft $C^7$ and to which is fastened the lever-arm $C^8$, the lower end of which carries a roller working in a cam-groove in a cam $C^9$ carried by the shaft S. The shape of this cam-groove is shown in Fig. 12. In adjusting the machine for longer or shorter blanks, it is necessary to adjust the time of the throw of the lever $C^6$ in order that the boards may be fed forward and delivered between the rolls B B at the proper instant to be applied in the correct position on the cloth. As the feed of the rolls is changed so that it starts sooner and continues longer, the time of the stroke of the pushers must be correspondingly altered. To accomplish this, means are provided for setting the cam $C^9$ to different angular positions around the shaft S. To this end a cup $S^4$ is keyed to the shaft and provided with a set-screw $s'$ engaging the hub $C^{10}$ of the cam, as shown in Fig. 6, so that by loosening this set-screw the cam may be turned around to any position and the screw again tightened to fix it.

For operating the frame $E'$ of the cutter E, I provide by preference a toggle motion. The cross-frame $E'$ is connected by vertically sliding bars $E^2$ (Fig. 7) to a lower cross-head $E^3$ which is forced down by the straightening out of toggle arms $E^4$ (Fig. 2) which react upwardly against a cross-frame $E^5$. The toggle is operated by a cam $E^6$ fixed on the shaft R, and which acts against a roller $E^7$ carried by a frame $E^8$ having arms which extend forward and are jointed to the toggle. The frame $E^8$ is guided by having forked arms which straddle the shaft R, as shown in Fig. 2. As the shaft turns the toggle is opened by springs $E^9$ applied thereto, whereby the lower cross-frame is pulled up, thereby elevating the knife. The frame $F'$ of the clamp F is connected by vertically sliding side rods $F^3$ (Fig. 8) with a lower cross-frame $F^4$ carrying a roller which is acted on by a cam $T'$ on the shaft T. This cam acts to lift the frame, and as the cam lowers it it descends by its own weight and by springs $F^5$ of sufficient tension to press down the clamp F with the requisite firmness. The frame $G^3$ which operates the end folders is connected by vertical sliding rods $G^4$ (Fig. 8) with a lower cross-frame $G^5$ carrying a roller against which acts a cam $T^2$ on the shaft T. The cam acts to lift this frame and it descends by its own weight. The clamp J is carried on a cross-frame $J'$ which is connected at its ends by vertical sliding rods $J^2$ to a lower cross-frame $J^3$ carrying a roller which is acted on by a cam $T^3$. This cam acts to lift the frame, and it is lowered by its own weight and by the tension of springs $J^4$ to push down the clamp J with the requisite pressure.

The rising and falling movements are imparted to the gages $k\ k$ by means of a cam $T^4$ on the shaft T. One of the gage carrying arms $k'$ on the shaft $k^2$ is connected to a rod $k^3$ extending downward as shown in Fig. 10, and carrying at its lower end a roller which is acted on by said cam. The rod and roller are guided by forked arms $k^4$ embracing the shaft T.

The frame $M'$ carrying the clamp M is connected at its ends to vertical sliding rods $M^2$ which are fastened beneath to a cross-frame $M^3$ (Fig. 11) on which is a roller $m^3$ against which acts a cam $T^5$ on the shaft T to raise the frame, it being lowered by its own weight and the tension of springs $M^4$ to press down the clamp M with the requisite pressure.

Figure 11:
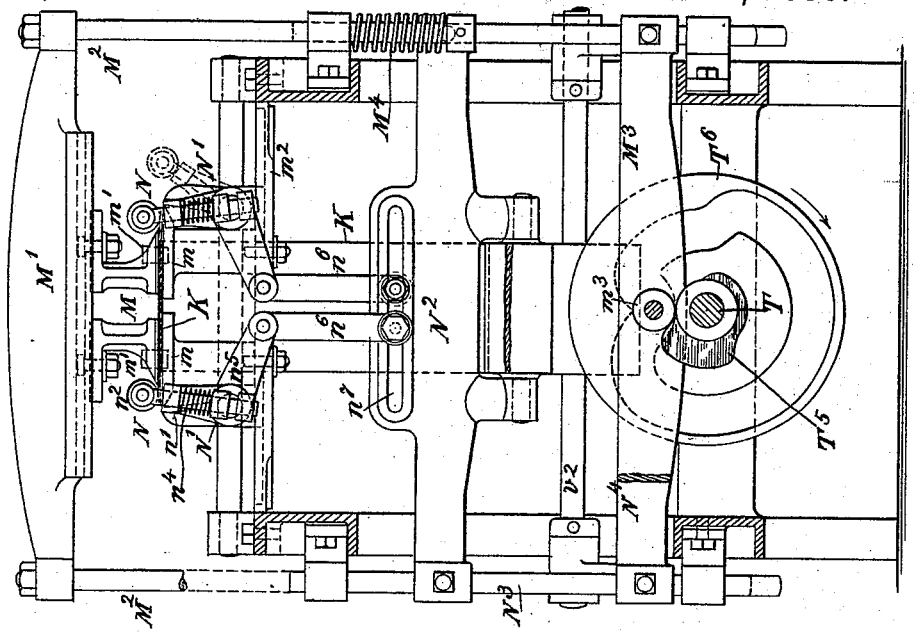

The cross-frame $N^2$ operating the side folders N N is connected at its opposite ends with vertical rods $N^3$, as shown at the left in Fig. 11, with a lower cross-frame $N^4$ carrying a roller $n^3$ (Fig. 2) which is engaged by a cam-groove in a cam T⁶ fixed on the shaft T. The groove in this cam acts both upwardly and downwardly to impart the requisite movements to the frame N² N⁴.

The several vertical sliding rods E², F³, G⁴, J², M² and N³ are all arranged outside the main side frames O of the machine, and all slide vertically in bearings l' l' applied thereto, with the exception of the rods E² which slide through eyes l² at their upper parts and are guided at their lower ends by the cross-frame E³, which slides in vertical guideways l³ in the side frames, all as shown in Fig. 1.

The feeding hooks H are operated by means of lever-arms H' H' on opposite sides of the machine, the upper ends of which are connected together by a rod to which the hooks H are pivotally connected. These arms are fixed on a shaft H² extending transversely of the machine, to which is fixed a lever-arm H³ projecting downwardly, so that the arms H' H' H³ and intervening rock-shaft H² constitute one lever. The end of this arm H³ is connected to a bar H⁴ which extends longitudinally beneath the machine and is fixed at its rear end to a frame H⁵ having a slot which embraces the shaft S, whereby it is guided. This frame carries a roller s², which travels in a cam-groove S³ in a cam S² fixed on the shaft S, see Figs. 1 and 6. The action of this cam is to move the rod H⁴ longitudinally and thereby vibrate the lever H³ H' in proper intervals of time to impart the requisite forward and backward movement to the hooks H H.

The feeding belt or apron K travels intermittently, remaining stationary while the clamps J and M are down, and moving after these clamps are lifted and during part of the time that they remain elevated. This belt is carried over pulleys or drums V V above, and it passes under drums V' V² beneath. Between these drums is mounted a roller v hung in bearings from the frame N², so that when this frame is lifted by the cam T⁶ this roller is carried up with it. The belt passes over this roller, so that its upward movement draws it tight against the drums V' V². The drum V' is mounted on a shaft v² which is driven continuously by any suitable means, preferably by a belt q' from a pulley q on the the sleeve Q' of the driving pulley (Fig. 16), this belt passing over a pulley q² fixed on the shaft v² (Fig. 4). While the clamp M is down, the belt K is dropped by the roller v out of contact with the driving drum V', as shown in Fig. 2, but after the clamp M has been raised the ascent of the frame N² to retract the side folders causes its roller v to take up the slack in the belt and draw the latter tight against the drum V', so that this drum drives the belt as long as the frame N² remains thus elevated. When the belt has traveled for a sufficient time, the frame N² is moved down sufficiently to release the belt from the traction of the drum V' thereby stopping it, and immediately thereafter the clamp M is brought down upon the table m to clamp the blank, after which the frame N² completes its descent and thereby moves the side folders N N against the blank. Thus the frame N² in its descent dwells for a moment in approximately its mid-position, so that the first half of its movement is effective to release and stop the feeding belt, its dwell being sufficient to give the clamp M time to come down, after which it executes the remainder of its movement which causes the side folders to act. The movement of the clamp M is first immediately upward upon the finishing of a blank, and before the next blank is fed to it it moves downward to nearly its final position, but remaining sufficiently elevated to enable the next blank to pass readily under it. The purpose of the movement of the clamp to this position is to bring the gages m' down to where they will stop the entering blank, and the clamp dwells in this position during the latter portion of the feed of the belt K to give time for the blank to pass beneath it and be stopped and brought into correct position by the gages. Immediately after the apron K comes to rest and during the dwell of the frame N² in its downward movement, the clamp M completes its descent and clamps the blank against the table.

My invention may be modified in many ways as will be apparent to any skilled mechanician. For example the feeding of the fabric forward by feeding rollers is not essential as it might be fed forward by any other kind of feeding mechanism, for example, by any means whereby two grasping or clamping members engage it above and beneath. My invention is not absolutely limited to the feeding of the fabric through the medium of the pairs of boards applied to it, this being done not because it is essential, but because it obviates the difficulties attending the grasping of a gummed surface. A portion of the fabric might be left ungummed to be engaged by the feeding mechanism. Other means than the drawing hooks H may be provided for transferring the blanks from the first to the second end folder.

I claim as my invention the following defined novel features each substantially as hereinbefore specified, namely:—

1. The combination of means for applying an adhesive coating to a web of covering fabric, means for applying side boards against its coated surface, and a feed mechanism for drawing forward said web consisting of pressure rolls having an intervening space greater than the thickness of the fabric but less than the thickness of the fabric and boards, whereby by the revolution of said rolls the fabric is grasped between them where said boards are applied to it, and in the spaces between said boards the rolls avoid contact with the gummed surface of the fabric.

2. The combination of means for gumming and feeding forward a web of covering fabric and means for applying pairs of side boards against its gummed surface, with means for applying strips of stiffening fabric against the gummed surface thereof between the two boards of each pair, said means comprising a guide for directing the stiffening fabric to place, and a cutter for cutting it off into lengths.

3. The combination of means for gumming and means for feeding forward a web of covering fabric and means for applying pairs of side boards against its gummed surface, with means for applying strips of stiffening fabric against the gummed surface thereof between the two boards of each pair, said means comprising a feeder for feeding forward the stiffening fabric, a cutter for cutting it off into lengths, and a guide for directing the cut off lengths to position against the gummed web.

4. In a machine for making book-covers, means for folding over the projecting flaps of the cover blank consisting of a table on which the blank is placed, a reciprocating clamp for holding it down on said table, and a folder consisting of two active parts, the one of which is constructed to turn the projecting flap up and hold it against the edge of the board and the other of which is constructed to fold down the flap upon the inner side of the board.

5. In a machine for making book-covers, means for folding over the projecting flaps of the cover blank upon the side board consisting of a table on which the blank is laid with the flap to be folded projecting beyond the edge of the table, a reciprocating clamp for holding the blank down against said table, constructed to clamp the board with its edge portion exposed on which the flap is to be folded, a folder acting against the edge of said table to first turn up said projecting flap and press it against the edge of the board and subsequently to turn down the flap against the inner side of the board, and driving mechanism for the clamp and folder constructed to first close the clamp upon said table to grip the blank, then to hold it there while actuating the folder, and finally when the folder has finished its operation to retract the clamp and release the blank.

6. In a machine for making book covers, the combination of means for applying an adhesive coating to a covering fabric, means for applying side-boards against the gummed surface of said fabric leaving edges thereof projecting to form flaps, and means for folding over the projecting flaps consisting of end folders acting to fold down the end flaps upon the boards, rollers for rolling down the folded end flaps, and side folders acting subsequently to fold down the side flaps.

7. In a machine for making book-covers, means for folding over the projecting flaps of the cover blank consisting of folders acting to fold down the flaps at opposite sides or ends of the blank, provided with means for creasing or indenting the flaps at the corners, and folders acting subsequently to fold down the remaining flaps, whereby a neat corner finish is insured.

8. In a machine for making book-covers, means for folding over the projecting flaps of the cover blank consisting of folders acting to fold down the flaps at opposite sides or ends of the blank, said folders comprising rollers for turning down the flaps against the inner sides of the boards, and creasing flanges carried by said rollers for indenting the flaps at the corners of the boards, whereby when the remaining flaps are folded down a neat corner finish will be made.

9. In a machine for making book-covers, means for folding down the projecting flaps at the ends of the cover blank comprising a roller for folding down said flaps against the inner sides of the boards, constructed with a middle portion of increased diameter adapted to enter the space between the boards to fold down the flap upon the back portion of the cover.

10. In a machine for making book-covers, the combination of means for applying a pair of side boards and an intervening stiffening strip against the gummed surface of a covering fabric, end folders for folding down the projecting end flaps thereof, and a roller for pressing said stiffening strip against said fabric in the space between said side boards.

11. In a machine for making book-covers, the combination of means for applying a pair of side boards against the gummed surface of a covering fabric, a first end-folder for folding down the projecting flap at one end of the blank upon the boards, a second end folder for folding down the opposite end flap upon the boards, side folders for subsequently folding down the side flaps upon the boards, and feeding mechanisms for feeding the blank from the point of application of the boards to the first end folder, and from the second end folder to the side folders.

12. The combination of means for applying an adhesive coating to a web of covering fabric, means for applying successive pairs of side boards against its coated surface, a cutter for cutting off said fabric into lengths between the successive boards, and folders for folding the projecting edges or flaps of said fabric down upon the inner side of said boards, with two feeding mechanisms, the first adapted to draw forward said web of fabric before it is cut off, and the second constructed to move forward the severed cover blanks between the successively acting folders.

13. The combination with a feed mechanism for feeding forward a web of gummed covering fabric of means for applying cover boards thereto consisting of a magazine having two compartments for holding two piles of such boards and a reciprocating pusher adapted to eject one board from each pile, the compartments of said magazine constructed of side walls connected to a transverse front wall, by laterally adjustable connections, whereby the compartments may be adjusted bodily toward or from each other to adapt the machine for making book-covers for books of different thicknesses, and the walls of each compartment adjustable toward or from each other to adapt them to side boards of different widths.

14. The combination with a feed mechanism for feeding forward a web of gummed covering fabric of means for applying cover boards thereto consisting of a magazine having two compartments for holding two piles of such boards and a reciprocating pusher adapted to eject one board from each pile, a driving shaft, said feed mechanism driven intermittently therefrom, a cam driven from said shaft and angularly adjustable relatively thereto, and a lever vibrated by said cam and connected to said pusher to impart reciprocatory movement thereto, whereby the time at which the pair of boards is fed to the web of fabric may be varied by an angular adjustment of said cam.

15. The combination of means for applying gum to a web of covering fabric and means for applying successive pairs of side-boards thereto, of a feed mechanism for drawing forward said web consisting of two pairs of pressure rolls engaging said web subsequently to the application of said boards thereto, the two rolls of each pair set sufficiently far apart to engage the fabric only through the medium of said boards, and the successive pairs of rolls arranged a distance apart no greater than the length of said boards, whereby the rolls of the second pair engage the advancing ends of the boards before the following ends thereof pass from between the rolls of the first pair, so that the feed is made continuous without bringing the rolls against the gummed surface of the web.

16. In a machine for making book-covers, a feed mechanism for drawing forward the web of covering fabric consisting of feed rolls and a driving mechanism for driving them forward intermittently comprising a revolving crank, a vibrating arm formed with a longitudinal slideway, a block sliding therein and engaged by said crank, a pawl carried by said arm, a wheel engaged by said pawl so that it is driven forward during the vibration of said arm in one direction and remains stationary during the return vibration thereof, and said wheel geared to said feed rolls.

17. In a machine for making book-covers, a feed mechanism for drawing forward the web of covering fabric consisting of feed rolls and a driving mechanism for driving them forward intermittently and adjustable to vary the length of such feeding movements, said mechanism comprising a revolving crank the throw of which is adjustable, a vibrating arm having a slideway, a block sliding therein and engaged by said crank, a pawl carried by said arm, a feed-wheel engaged by said pawl during each forward vibration of said arm, and said feed-rolls geared to said feed-wheel, whereby by adjusting the throw of said crank the length of the feeding movement is correspondingly varied.

18. In a machine for making book-covers, a feed mechanism for drawing forward the web of covering fabric consisting of feed-rolls and a driving mechanism for driving them forward intermittently and adjustable to vary the length of such feeding movements, said mechanism comprising a revolving crank consisting of a crank-arm formed with a longitudinal slideway, a block carrying the crank stud and sliding along said slideway, a screw for adjusting said block along said slideway, a vibrating arm formed with a longitudinal slideway, a sliding block sliding along the slideway on said arm and engaged by the crank-stud, a pawl carried by said vibrating arm, a feed-wheel engaged by said pawl and driven thereby at each forward vibration of the arm to an extent proportional to the throw of said crank, and said feed-rolls geared to said feed-wheel.

19. The combination with means for feeding forward a web of gummed covering fabric and means for applying side-boards thereto, of a cutter for cutting off said fabric into lengths consisting of a straight blade for making a transverse cut across said web, and angular blades carried therewith for simultaneously cutting out V-shaped pieces at the sides of the web to form the corner portions of the flaps of the cover blank, and operating mechanism geared to move said cutter to cut off the fabric in the spaces between each two successive pairs of sideboards.

20. The combination with means for feeding forward a web of gummed covering fabric and means for applying side-boards thereto, of a cutter for cutting off said fabric into lengths consisting of a straight blade for making a transverse cut across said web, and angular blades for cutting out V-shaped pieces at the sides of the web, a cutter-frame to which said straight blade is fixed, and adjustable frames to which said angular blades are fixed, whereby to adjust the cutter to a different width of fabric the straight blade may be replaced by one of different length, and the angular blades adjusted out or in to bring them against the ends of the straight blade.

21. The combination with means for feeding forward a web of gummed covering fabric and means for applying side-boards thereto, of a cutter for cutting off said fabric into lengths consisting of a straight blade for making a transverse cut across said web, and angular blades for cutting out V-shaped pieces at the sides of the web, a cutter-frame to which said straight blade is fixed, and sliding frames to which said angular blades are fixed, and an adjusting screw to move said sliding frames simultaneously toward and from the intervening fixed blade.

22. In a machine for making book-covers, the combination with means for feeding forward a web of gummed covering fabric and means for applying side-boards thereto, of a cutter for severing the web of cover fabric consisting of a cutting block, a rising and falling cutter frame carrying a cutting blade, a toggle for thrusting down said cutter-frame, a driving shaft, a cam thereon acting to straighten said toggle and thereby force said cutting blade against said block, and gearing for causing said cam to act to make the cut when the feeding mechanism brings the space between two successive pairs of boards opposite the knife.

23. The combination of means for feeding forward a web of gummed covering fabric and means for applying side-boards thereto, with an arbor carrying a roll of stiffening strip, a pair of feed-rollers for advancing said strip geared to the mechanism for feeding said web, a knife for cutting off said strip, and a guide for directing the cut off length thereof against said gummed web.

24. In a machine for making book-covers, a folder for turning a projecting flap of covering fabric over the edge of the side-boards consisting of means for holding the cover blank, an oscillating shaft having radial arms, a folding down roller carried by said arms, a folding blade mounted on an arm carried on said shaft and pressed forward by a spring so that when the blade is retracted it stands in advance of said roller, and means for oscillating the shaft to bring said blade against the edge of the blank thereby turning up the flap and for continuing its oscillation whereby the roller is carried over the top of said blade to fold down the flap on the inner side of the board, and for oscillating said shaft backward to retract said roller and blade.

25. In a machine for making book-covers, a folder for turning a projecting flap of covering fabric over the edge of the side-boards consisting of means for holding the cover blank, an oscillating shaft having radial arms, radially sliding rods carried by said arms, springs for drawing said rods downwardly, and a folding down roller carried by said rods and adapted by the oscillation of said shaft to be moved over the upper surface of the blank, whereby it presses the flap down against the side-board with a pressure determined by the tension of said springs.

26. The combination of table $f$ adjustable longitudinally, clamp F also adjustable longitudinally, end folder G carried by said table $f$ so as to be adjustable therewith, reciprocating frame $G^3$ having slotted head $g^5$, and a link $g^3$ connecting said folder to said frame and engaging the slotted head thereof, whereby as said table and folder are adjusted to different positions, the connection of said link may be made in different portions of said slotted head.

27. The combination of first end folder G, second end folder G', and means for feeding the blank from the first end folder to the second consisting of a bridge-plate I, and feeding arms H H adapted to propel the blank over said plate.

28. The combination of first end folder G, second end folder G', bridge-plate I, feeding arms H H, vibrating lever-frame H' carrying said arms, and a cam for vibrating said lever-frame.

29. The combination of table $j$, clamp J, end folder G', means for feeding the blank onto said table, and gages $k$ for stopping the blank in the correct position, and mechanism for moving said gages out of the way of the blank before the next feeding movement.

30. The combination of clamp J, roller $j'$ carried thereby, feeding apron K, and a driving mechanism adapted to lift said clamp and cause it to dwell at a height sufficient to release the blank but not enough to lift off the weight of said roller $j'$, whereby the latter serves to hold the blank in frictional contact with said apron so that the latter may feed it forward.

31. In a machine for making book-covers, the combination of end folders G' constructed to fold the end edges of the covering fabric down upon the boards, side folders N N, constructed to fold the side edges of the fabric down upon the boards, the end and side folders constructed to act while the blank is held stationary, and feeding apron K for feeding the blanks from the end folder to the side folders, with driving mechanism for driving said apron intermittently, advancing it during the interval between the folding operations.

32. In a machine for making book-covers, the combination with end folders of means for folding the side flaps comprising a folding table $m$, a clamp M for holding the blank against said table, reciprocating side folders N N for folding down said flaps over the side edges of the blank, and a driving mechanism for actuating said clamp and folders, adapted to first operate the clamp to hold the blank, and then impart the working stroke to the folders.

33. In a machine for making book-covers, means for folding down the side flaps of the blank consisting of a table made in two sections adjustable to different widths, a clamp for holding down the blank against said table made in two sections adjustable to different widths, and side folders carried by the respective sections of said table, whereby they are adjusted with the latter.

34. In a machine for making book-covers, the combination of side folders for laying down the side flaps, a table and clamp for holding the blank during the operation thereof, a feeding apron moving over said table while said clamp is elevated, and gages carried by said clamp for stopping the blank as it is fed over said table and holding it stationary in the correct position until the stoppage of the apron.

35. The combination of table $m$ constructed with laterally adjustable sections, side folders N N adjustable therewith and comprising folders carried by rock shafts having arms $n^5$ operated through links $n^6$, and a vertically-reciprocating frame $N^2$ for operating said folders, formed with an elongated slot $n^7$ to which said links may be pivoted in different positions according to the different positions to which the side folders are moved by the adjustment of the sections of said table.

36. In a machine for making book-covers, the combination as a means for feeding forward the cover blanks of an endless apron K having drums over which it is carried, a continuously revolving driving drum under which it is carried, a tightening roller, and a reciprocating frame carrying said roller and adapted to move it to such extent as to draw the apron against said driving drum so that the latter is propelled intermittently, being causing to travel forward whenever it is drawn taut by said roller.

In witness whereof I have hereunto signed my name in the presence of two subscribing witnesses.

ALFRED BREDENBERG.

Witnesses:
ARTHUR C. FRASER,
GEORGE H. FRASER.